July 5, 1966  H. B. G. CASIMIR  3,259,844
SIGNAL AMPLITUDE DISCRIMINATOR HAVING A PLURALITY OF
SUPERCONDUCTING LOOPS ARRANGED TO RESPOND TO THE
MAGNETIC FIELD PRODUCED BY THE SIGNAL
Filed Oct. 19, 1962

INVENTOR
HENDRIK B.G. CASIMIR
BY
AGENT

United States Patent Office

3,259,844
Patented July 5, 1966

3,259,844
SIGNAL AMPLITUDE DISCRIMINATOR HAVING A PLURALITY OF SUPERCONDUCTING LOOPS ARRANGED TO RESPOND TO THE MAGNETIC FIELD PRODUCED BY THE SIGNAL
Hendrik Brugt Gerhard Casimir, Eindhoven, Netherlands, assignor to North American Philips Company, Inc., New York, N.Y., a corporation of Delaware
Filed Oct. 19, 1962, Ser. No. 231,713
Claims priority, application Netherlands, Oct. 26, 1961, 270,682
19 Claims. (Cl. 324—103)

This invention relates to amplitude discriminators for electrical pulses, and more particularly to such devices utilizing superconductive circuit elements.

Amplitude discriminators are used, for example, in nuclear investigation for determining the height of pulses. In applications of this type, it is very desirable for the device to respond accurately and reliably to pulses of extremely short duration, for example, of the order of a few nanoseconds.

Amplitude discriminators are well known which comprise a series of elements which pass from a rest condition to a working condition if the pulses to be detected exceed a given threshold value, the threshold values increasing or decreasing sequentially for the various elements. Such devices can only determine between which threshold values the amplitude of the pulse lies. This is not objectionable for making accurate measurements provided that the difference between the sequential threshold values is small enough.

In certain devices the above mentioned elements are, for example, in the form of rings of magnetic material having a rectanular hysteresis loop. These rings are coupled to a conductor to which the pulses to be detected are applied. The rings are either coupled to the conductor via different numbers of turns, or have different diameters, so that upon increasing the current through the conductor the rings successively pass from one condition of remanence to the other if the magetic field exceeds the critical coercive force of the magnetic material comprising the rings.

Other known devices have utilized, for example, amplifying tubes or rectifiers which are adjusted to different workpoints by applying different biases thereto. The rectifiers or amplifying tubes then commence conduction for different amplitudes of the voltage to be tested.

In general, the response of known devices are comparatively slow, so that they do not respond to nanosecond pulses, as for example, with magnetic rings, or they are comparatively expensive, which is especially apparent if a large number of elements is required for accurate measurements.

It is therefore an object of the invention to provide a reliable and inexpensive amplitude discriminator which eliminates to a considerable degree the limitations of the known arrangements.

The above object has been achieved by constructing an amplitude discriminator utilizing superconductive circuit elements. In the device according to the present invention, several portions of a conductor made from a material of normal conductivity and traversed by a constant current are bridged by loops of superconductive material. Superconductive materials such as tantalum, niobium and lead may be used for the loops. These materials exhibit no measurable electrical resistance to current flow when their temperature is reduced below a critical temperature in the vicinity of absolute zero. A magnetic field is produced by the pulses to be detected or measured in which the magnetic lines of force produced by the pulses are preferably arranged to run substantially parallel to the planes of the superconductive loops. Certain portions of the superconductive material of the various loops are arranged in areas where the magnetic field intensity produced by the pulses has different values. In this manner, the magnetic field produced by pulses of different amplitudes is effective to switch different superconductive loops from a condition of superconductivity to normal conductivity as the threshold values of the various loops are successively exceeded. The loops are designed so that when said portions of the loops pass to the condition of normal conductivity upon the critical field strength being exceeded, their resistance is higher than the resistance of the portions of the first mentioned conductor bridged by the loops. Provision is also made for indicator means responding to variations in the current traversing the loops.

In order that the principles of the invention may be readily understood and carried into effect, a preferred embodiment will now be described in detail, by way of example, with reference to the accompanying diagrammatic drawing in which.

Figure 1:
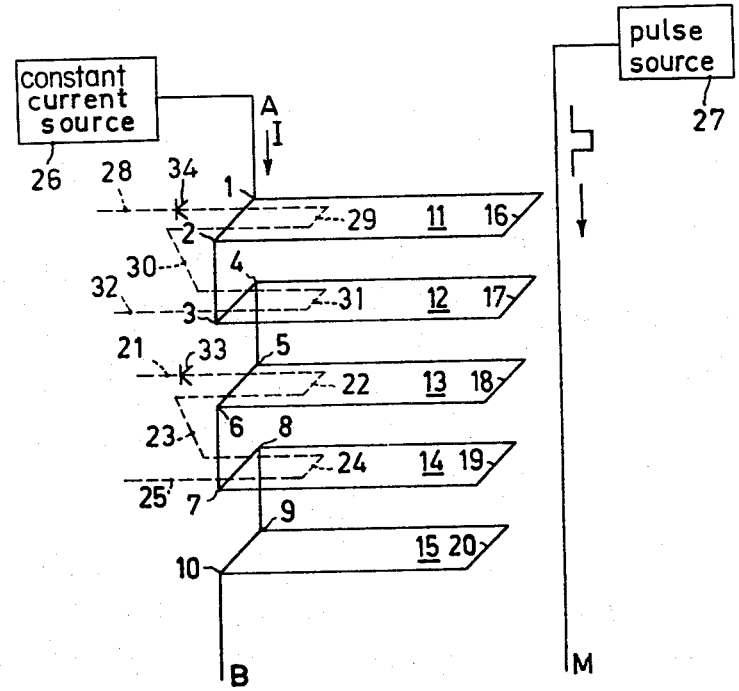
FIGURE 1 shows one embodiment of the invention.

In the preferred embodiment of FIGURE 1, the portions 1–2, 3–4, 5–6, 7–8 and 9–10 of a conductor AB are bridged by loops 11, 12, 13, 14 and 15 made of superconductive material, for example, lead. Although only 5 loops are illustrated, it is of course obvious that the number of loops may be increased or decreased according to requirement. The conductor AB is preferably made of a material of normal conductivity, that is to say of non-superconductive material. When the device is cooled below the critical temperature of the particular superconductive material used, for example, to a few degrees Kelvin, by placing it in a container filled with liquid helium, the resistance of the loops 11 to 15 is zero whereas the resistance of conductor AB, although being low, still has a finite value. With the aid of well known external circuitry, illustratively represented by current source 26, conductor AB has supplied to its terminals a measuring current I which thus flows along the path A, 1, 16, 2, 3, 17, 4, 5, 18, 6, 7, 19, 8, 9, 20, 10 and B. The portions 1–2, 3–4, 5–6, 7–8 and 9–10 of conductor AB are thus currentless since their resistance is comparatively high relative to the loops connected parallel thereto.

The loops 11 ot 15 are illustrated as lying substantially in parallel horizontal planes. The right-hand ends 16, 17, 18, 19 and 20 are at successively varying distances from a vertical conductor M to which the current pulses to be tested or detected are applied by pulse source 27. A current through conductor M produces a magnetic field comprising lines of force which form circles in horizontal planes around conductor M. Since the magnetic lines of force are in the same plane as the loops 11 to 15, they do not intersect the loops 11 to 15. A pulse in conductor M will not therefore produce induction voltages of any appreciable magnitude in the loops. Furthermore, since the distances between the portions 16, 17, etc. and conductor M gradually increase from top to bottom, the magnetic field intensity at the portions 16, 17, etc. decreases from top to bottom for a given current through conductor M, since the strength of the magnetic field decreases as the distance from the conductor M increases.

Other means of variably coupling the magnetic field produced by the pulses to be detected flowing in conductor M to the superconductor loops 11 to 15 will of course suggest themselves. Alternatively, each of the loops may be situated in a magnetic field of equal intensity, but each loop may consist of a different superconductive material having a different critical field strength. In this case, each of the portions 16, 17, etc. of FIG. 1 are equidistant from the conductor M. As in the first method, a given amplitude pulse in conductor M will cause selective switching of predetermined loops 11 to 15, depending upon which loops have their critical threshold values exceeded. Furthermore, a combination of these two techniques is also possible wherein the loops are located at successively varying distances from conductor M, in FIG. 1, and are made of different superconductive materials having different critical field strength threshold values. Preferably, the critical threshold value of the successive loops 11, 12, etc. should increase or decrease consecutively from one end to the other. This latter method may be utilized to increase the sensitivity between successive loops or to extend the overall amplitude range of the apparatus.

Returning now to the preferred embodiment, the superconducting condition may be disturbed and the superconductive material may be changed to a condition of normal conductivity, despite the low temperature, by bringing the material into a magnetic field having a strength greater than a given critical value $H_c$. This critical value is dependent upon the temperature and will be lower as the temperature more closely approaches the critical temperature below which superconduction only is possible. In other words, the transition temperature for a superconductive material is lowered as the magnetic field applied to the material is increased.

Figure 2:
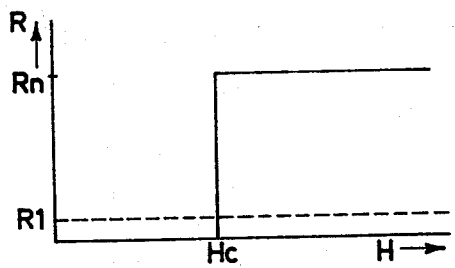
FIGURE 2 is a plot of resistance versus magnetic field wherein the transition between normal and superconductive states is illustrated for a typical superconductive material.

FIG. 2 shows the manner in which the resistance R at the ambient temperature depends upon the magnetic field H. The resistance, upon increasing the field strength H, is seen to suddenly jump from the value zero to the finite value $R_n$ if the critical threshold value $H_c$ is exceeded.

In the device of FIG. 1, upon increasing the current through conductor M, the critical magnetic field strength $H_c$ is exceeded successively at the portions 16, 17, 18, 19 and 20. These portions will thus successively revert to the normally conducting condition. The portions 16 to 20 preferably have extremely small cross sections, and may be applied as thin layers or films to a support made of insulating material, not shown, for example by well-known evaporation deposition techniques, so that they still have a zero resistance in the superconducting condition. However, on passing to a condition of normal conductivity, they have a resistance $R_n$, which is comparatively high relative to the resistance $R_1$ of the portions 1–2, 3–4, etc. of conductor AB, which are bridged by the loops 11, 12, etc. Preferably the portions 16, 17, etc. are made from a superconductive material having a transition point lower than that of the other portions of the loops. As mentioned above, the finite resistance, $R_n$, of the loops 11, 12, etc. is substantially greater than the resistance $R_1$ of the portions 1–2, 3–4, etc. of conductor AB. Therefore, when a loop passes to the condition of normal conductivity, the current traversing the loop is reduced to a very low value, whereas substantially the full current is passed through the corresponding portions 1–2, 3–4, etc. of conductor AB. Consequently, when pulses to be tested are applied to conductor M, one or more of the loops 11, 12, etc. become normally conducting as a function of the amplitude of these pulses. A variation thereby occurs in the magnetic fluxes produced by the current flowing in said loops. The loops 11, 12, etc. are successively coupled in pairs to "read" windings, of which only the read winding 21, 22, 23, 24, 25 of the pair of loops 13–14 and the read winding 28–32 of the loops 11–12 are shown for the sake of clarity. The other loops 12–13, etc. are provided with read windings in a similar manner. The read windings are coupled to the pairs of loops in an opposite sense so that, if a flux variation in two consecutive loops occurs, the induction voltages produced in the two parts of the associated read winding counteract one another, thereby producing a substantially zero output voltage.

Assume that for a given amplitude of the pulses to be detected, for example, the loops 11, 12, and 13 are normally conducting, whereas the loops 14 and 15 remain superconducting. The associated output read windings of the pairs of loops 11–12, 12–13 do not deliver output voltages since the partial induction voltages neutralize each other. The output read windings, not shown, of the pairs of loops 14–15 etc. do not deliver output voltages either since flux variations do not occur therein. An output voltage occurs only across the output winding 21–25 associated with loops 13–14, since an induction voltage occurs in loop 13, whereas there is no induced voltage in loop 14 under the assumed conduction. At the termination of the pulses to be detected the loops again become superconducting, so that the portions of conductor AB connected parallel thereto again become currentless and the initial condition of rest in which all loops are superconductive is restored. A pulse is also produced in the output winding 21–25 at that time, but of opposite polarity. Pulses of a given polarity only may be utilized by connecting rectifiers 33, 34, etc. in series with the output windings 21–25 etc.

The pulses produced in the output read windings may be applied to suitable apparatus for detecting, amplifying, shaping, and for registering or indicating said pulses, which apparatus are well known per se and do not form a part of the invention.

It is to be noted that at the beginning and the end of the pulses the current does not vary abruptly, but transient phenomena occur having a duration dependent upon the relationship between inductance and resistance. However, said switching times may be made very short by suitable proportioning of the various elements so that the device responds to pulses of only a few nanoseconds, while the interval between the pulses may also be very short.

The output windings may be connected to individual counters so that it is possible for the number of pulses having different amplitudes between given limiting values to be determined percentagewise from among a large number of pulses.

While the fundamental novel features of the invention, as applied to a preferred embodiment have been described, it will be understood that other means for variably coupling the magnetic field produced by the pulses to be detected to the various superconductive elements or loops will suggest themselves to those skilled in the art, and various modifications in the form and details of the device illustrated and in its operation may be made without departing from the spirit of the invention. The invention is not limited to the precise embodiments described and it is intended to be limited only as indicated by the scope of the following claims.

What is claimed is:

1. Apparatus for detecting the amplitude of an electric signal, comprising a first conductor of finite resistance, a plurality of superconductor elements bridging portions of said first conductor and having first and second conductivity states, means for applying a predetermined current to said first conductor, means for producing a magnetic field proportional to the amplitude of said signal to be detected, said latter means and said superconductor elements being positioned relative to one other so that said field producing means are effective to cause different intensities of magnetic field to be applied to different ones of said elements thereby to drive predetermined ones of said elements from said first to said second state whenever the critical field strength thereof is exceeded, and indicator means arranged to respond to a change of state produced in said superconductor elements by said electric signal.

2. An amplitude discriminator for electric signal pulses comprising a first conductor of finite resistance, a plurality of superconductor elements bridging portions of said first conductor, each of said elements having a critical field value defining first and second states of superconductivity and normal conductivity, respectively, means for applying a predetermined current to said first conductor, means for producing a magnetic field proportional to the amplitude of said signal pulses, said latter means being positioned in magnetic field coupling arrangement with said superconductor elements so that a given amplitude signal pulse is effective to cause predetermined ones of said elements to undergo a transition from a superconductive to a normal state, and means for sensing current variations produced in said superconductor elements by said signal pulses.

3. An amplitude discriminator for electric signal pulses comprising a first conductor of finite resistance, a plurality of superconductor elements maintained at a superconductive temperature and bridging portions of said first conductor, said elements having a superconductive and a resistive state, means for applying a predetermined current to said first conductor, means for differentially applying a magnetic field determined by the amplitude of said signal pulses to said superconductor elements thereby to selectively switch said elements from said superconductive to said resistive state, and means for sensing current variations produced in said superconductor elements by said signal pulses.

4. An amplitude discriminator for electric signal pulses comprising a first conductor of finite resistance, a plurality of elements comprising loops of superconductive material bridging portions of said first conductor and having first and second states of superconductivity and normal conductivity, respectively, means for applying a constant current to said first conductor, conductor means for producing a magnetic field proportional to the amplitude of said signal pulses, said conductor means being positioned adjacent to and at different distances from said superconductor elements so that a given amplitude of said signal pulse causes predetermined ones of said elements to undergo a transition between said first and second states, and means for sensing current variations produced by a change of state in said superconductor elements.

5. Apparatus as described in claim 4 wherein the resistance of each of said loops in the normal conductivity state is greater than the resistance of the portion of said first conductor bridged thereby.

6. An amplitude discriminator for electrical signal pulses comprising a first conductor of finite resistance, a plurality of superconductor elements maintained at a superconductive temperature and bridging portions of said first conductor, each of said elements having a different critical field strength value defining first and second resistance states of said element, means for applying a predetermined current to said conductor, means for producing a magnetic field proportional to the amplitude of said signal pulses, said latter means being positioned in magnetic field coupling arrangement with said superconductor elements, said superconductor elements undergoing a transition from said first to said second state whenever their respective critical field strengths are exceeded, and means for sensing the change of state of said superconductor elements.

7. An amplitude discriminator for electric signal pulses comprising a first conductor of finite resistance, a plurality of elements comprising planar loops of superconductive material arranged in substantially parallel planes and bridging predetermined portions of said first conductor, said elements having a critical field strength value defining first and second resistance states of said elements, means for applying a predetermined current to said first conductor, means for producing a magnetic field proportional to the amplitude of said signal pulses, said latter means being positioned in magnetic field coupling arrangement with said superconductor elements so that a given amplitude signal pulse is effective to cause different intensities of magnetic field to be applied to different ones of said superconductor elements, said superconductor elements undergoing a transition from said first to said second state whenever their respective critical field strengths are exceeded, and means for sensing the change of state of said superconductor elements.

8. Apparatus as defined in claim 7 wherein said magnetic field producing means are arranged to produce magnetic lines of force which are substantially parallel to the planes of said loops.

9. An amplitude discriminator for electric signal pulses comprising a first conductor of finite resistance, a plurality of elements comprising planar loops of superconductive material arranged in substantially parallel planes and bridging predetermined portions of said first conductor, said elements having a critical field strength value defining first and second resistance states of said elements, means for applying a predetermined current to said first conductor, current carrying means for applying a magnetic field proportional to the amplitude of said signal pulses to the superconductor elements, said current carrying means being disposed adjacent and substantially perpendicular to said planar loops and at different distances therefrom so that a given amplitude signal pulse is effective to cause different intensities of magnetic field to be applied to different ones of said superconductor elements, said superconductor elements switching from said first to said second state whenever their respective critical field strengths are exceeded, and means for sensing the change of state of said superconductor elements.

10. Apparatus as described in claim 9 wherein said first state is a state of superconductivity and said second state is one of normal conductivity and wherein the resistance of each of said loops in the normal conductivity state is greater than the resistance of the portion of said first conductor bridged thereby.

11. An amplitude discriminator for electric signal pulses comprising a first conductor of finite resistance, a plurality of elements comprising loops of superconductive material bridging portions of said first conductor and having first and second states of superconductivity and normal conductivity, respectively, means for applying a predetermined current to said first conductor, current carrying means for producing a magnetic field proportional to the amplitude of the signal pulses, said current carrying means being positioned in magnetic field coupling arrangement with said superconductor elements so that a signal pulse of given amplitude is effective to cause different intensities of magnetic field to be applied to different ones of said superconductor elements, said superconductor elements switching from said first to said second state whenever their respective critical field strengths are exceeded, and means for sensing the state of said superconductor elements comprising a plurality of output windings, each of said output windings being magnetically coupled to corresponding successive pairs of superconductor loops, each output winding being coupled in an opposite sense to each of its two corresponding loops.

12. An amplitude discriminator for electric signal pulses comprising a first conductor comprised of a material of normal conductivity, means for applying a predetermined current to said first conductor, a series of elements comprising planar loops of superconductive material bridging portions of said first conductor and having first and second states of superconductivity and normal conductivity, respectively, said elements switching from the first state to the second state if a given threshold value of the signal pulses is exceeded, said threshold values being different for the various elements, means for producing a magnetic field proportional to said signal pulses and having lines of force which run parallel to the planes of the loops, certain portions of the superconductive material of the various loops being arranged at areas at which the magnetic field produced by said signal pulses has different values, each of said portions of the loops switching to the second state of normal conductivity if its critical field strength is exceeded, the resistance of said loop in the second state being higher than the resistance of the portion of said first conductor bridged thereby, and indicator means responsive to current variations in said loops.

13. Apparatus as described in claim 3 wherein said sensing means comprises at least first and second output windings each of which is magnetically coupled to an individual one of said superconductor elements, and means for connecting said first and second windings in series opposition.

14. A signal amplitude detector adapted to operate at a given low temperature comprising a first conductor having a finite resistance at said given temperature, means coupled to said first conductor for causing a predetermined current to flow therein, a second conductor connected in parallel with a portion of said first conductor and composed of a superconductor material which is normally superconductive at said given low temperature, a third conductor connected in parallel with another portion of said first conductor and composed of a superconductive material which is normally superconductive at said given low temperature, a fourth conductor adjacent to and in magnetic field applying relationship to said second and third conductors, and means coupled to said fourth conductor for causing a current flow therein which is proportional to the amplitude of the signal to the detected, said second, third and fourth conductors being positioned in a predetermined relationship whereby the magnetic field produced by said current flow in said fourth conductor is differentially coupled to said second and third conductors to produce different intensities of magnetic field therein.

15. Apparatus as described in claim 14 further comprising sensing means electrically isolated from said first conductor and in magnetic field coupling relationship with said second and third conductors.

16. A signal amplitude detector adapted to operate at a given low temperature comprising a source of constant current, first and second resistance elements having a finite resistance at said given temperature, means connecting said first and second resistance elements in series with said current source, first and second conductors composed of superconductor material connected in parallel with said first and second resistance elements, respectively, said first and second conductors having a superconductive and a resistive state, a third conductor arranged in magnetic field applying relationship with said first and second conductors, means coupled to said third conductor for causing a current flow therein which is proportional to the amplitude of the signal to be detected, said first, second and third conductors being positioned in a given relationship whereby the magnetic field produced by said current flow in said third conductor produces different magnetic field intensities in said first and second conductors whereby a given signal amplitude is effective to selectively drive said first and second conductors between said superconductive and resistive states, and means positioned adjacent said first and second conductors for sensing a change of state thereof.

17. A signal amplitude detector adapted to operate at a given low temperature comprising a first conductor having a finite resistance at said given temperature, means coupled to said first conductor for causing a predetermined current to flow therein, a second conductor adapted to produce a magnetic field proportional to the amplitude of the signal to be detected, a plurality of elements comprising loops of superconductive material connected in parallel with individual portions of said first conductor along the length of said first conductor, said loops comprising a superconductive segment having a superconductive and a resistive state, said loops being arranged so that said segments are located at successively varying distances from said second conductor whereby a given signal amplitude is effective to cause said segments to selectively undergo a transition between said superconductive and resistive states, and means for sensing a change of state in said segments.

18. Apparatus as described in claim 17 wherein said segments are composed of a superconductor material having a lower critical field value than the remaining portions of said loops at said given temperature.

19. Apparatus as described in claim 17 wherein predetermined ones of said loops are composed of superconductor materials having different critical field values.

References Cited by the Examiner
UNITED STATES PATENTS
3,020,489    2/1962    Walker _____ 324—70

WALTER L. CARLSON, *Primary Examiner.*

RUDOLPH V. ROLINEC, *Examiner.*

J. J. MULROONEY, *Assistant Examiner.*